Dec. 2, 1941.  T. O. MEHAN  2,264,949

MOTOR DRIVE MECHANISM FOR ADDING MACHINES

Filed Jan. 5, 1940  2 Sheets-Sheet 1

Inventor
Thomas O. Mehan
By Benjamin T. Hupper
Atty.

Dec. 2, 1941. T. O. MEHAN 2,264,949
MOTOR DRIVE MECHANISM FOR ADDING MACHINES
Filed Jan. 5, 1940   2 Sheets—Sheet 2
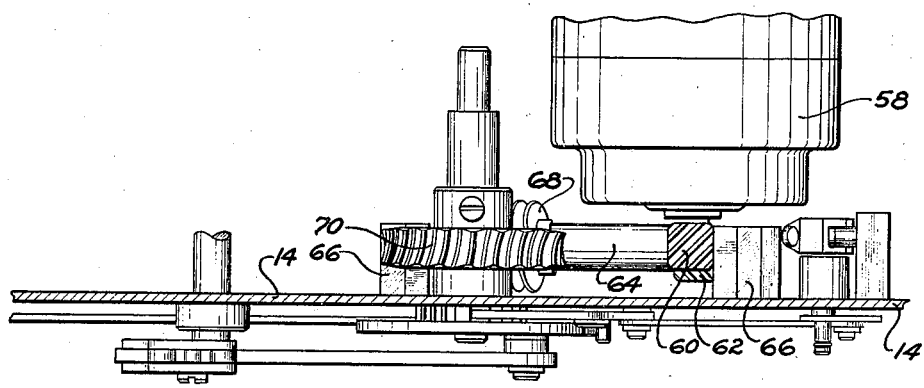
Fig. 3
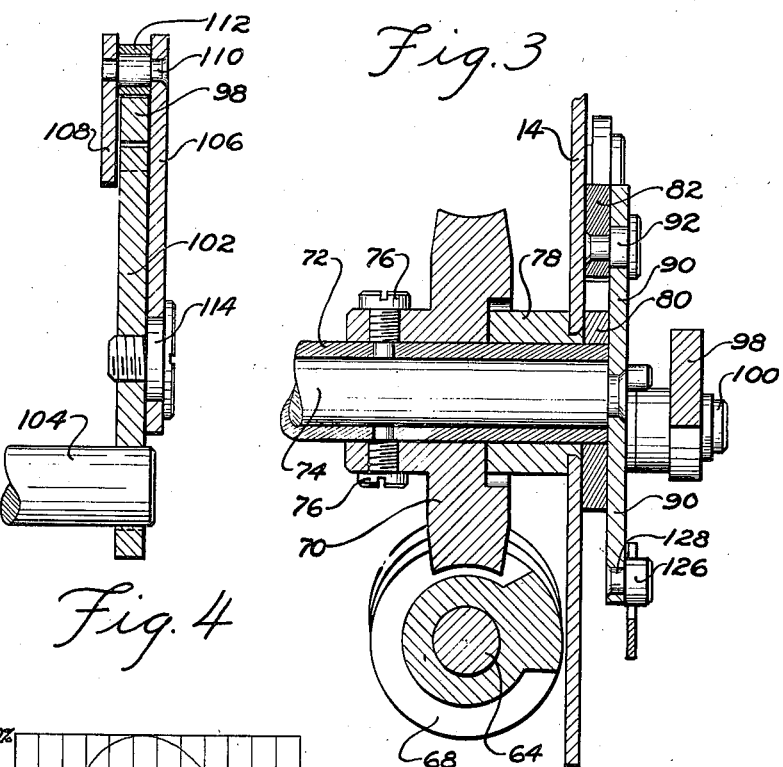
Fig. 4
Fig. 5
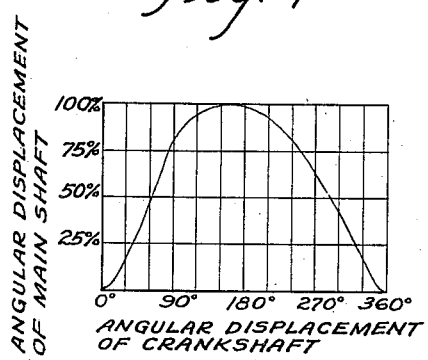
Fig. 6
Inventor
Thomas O. Mehan
By Benjamin J. Napper
Atty.

Patented Dec. 2, 1941

2,264,949

UNITED STATES PATENT OFFICE 2,264,949

MOTOR DRIVE MECHANISM FOR ADDING MACHINES

Thomas O. Mehan, Park Ridge, Ill., assignor to Victor Adding Machine Company, Chicago, Ill., a corporation of Illinois Application January 5, 1940, Serial No. 312,612

5 Claims. (Cl. 74—78)

My invention relates generally to adding machines, and more particularly to improvements in the motor drive and control mechanisms for machines of this type.

It is an object of my invention to provide a simple and effective driving means for power operated adding machines and the like.

A further object is to provide an improved motor drive mechanism for adding machines and the like in which a desired difference in speed of operation upon the forward and return strokes is obtained by a very simple mechanical arrangement.

A further object is to provide an improved motor drive mechanism for adding machines in which the main drive shaft is moved through its forward oscillatory stroke much more rapidly than through its return stroke.

A further object is to provide an improved motor drive mechanism for adding machines in which the forward stroke of the main shaft is accomplished during less than one-half the duration of the complete oscillatory cycle.

A further object is to provide an improved motor drive mechanism for adding machines in which the angular displacement of the main shaft takes place according to a complex pattern, a pronounced component of which is simple harmonic motion.

A further object is to provide an improved motor drive mechanism for adding machines and the like in which the simple harmonic driving motion of a crank is altered by means of an eccentric gear segment so as to cause the segment to have angular motion about its axis in which simple harmonic motion is an important component.

Other objects will appear from the following description, reference being had to the accompanying drawings, in which:

Figure 3 is a fragmentary horizontal sectional view showing the motor drive mechanism;

Figure 4 is a detailed sectional view taken on the line 4—4 of Fig. 2; and,

Figure 5 is a vertical sectional view taken on the line 5—5 of Fig. 2.

The motor drive mechanism disclosed herein is adapted for use on any adding or similar machine, but is of particular utility when used in conjunction with a ten-key adding machine of the type shown in my co-pending application Serial No. 123,320, filed February 1, 1937. In such machines, the pin carriage, which is a relatively heavy assembly, must be moved to a considerable distance (especially if the operation involves the addition or subtraction of an amount having a large number of digits) and this return of the pin carriage requires the application of a substantial force to overcome the tension of the spring used to drive the pin carriage forwardly and to provide energy for returning set pins of the pin carriage to their normal positions. If it is endeavored to return the pin carriage to its normal position at a rapid rate, the carriage will, due to its inertia, strike its limiting stop with a relatively hard blow. The resultant noise and excessive wear upon the parts is, of course, of considerable disadvantage.

It is therefore among the objects of my invention to provide a ten-key adding machine with a motor drive mechanism which will return the pin carriage to its normal position at a relatively slow speed, using more than half of the operating cycle for this purpose. This is accomplished through the use of a novel arrangement of driving mechanisms for transmitting the driving power from the motor to the main operating shaft of the machine.

Figure 1:
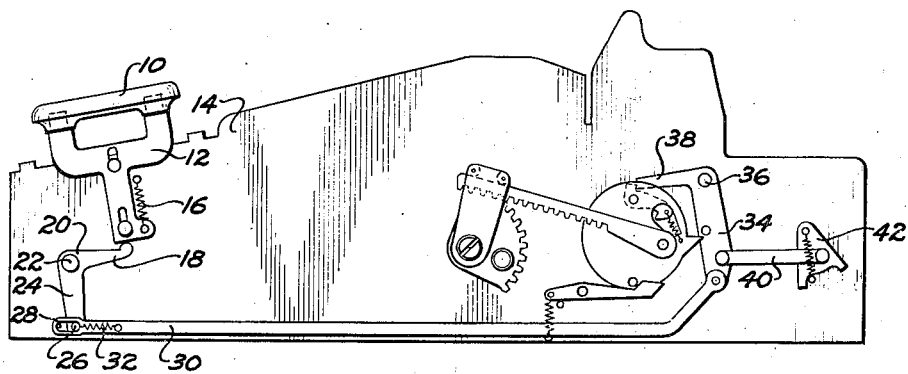
Figure 1 is a side elevational view of an adding machine with the casing and other parts removed to show the motor drive mechanism.
Figure 2:
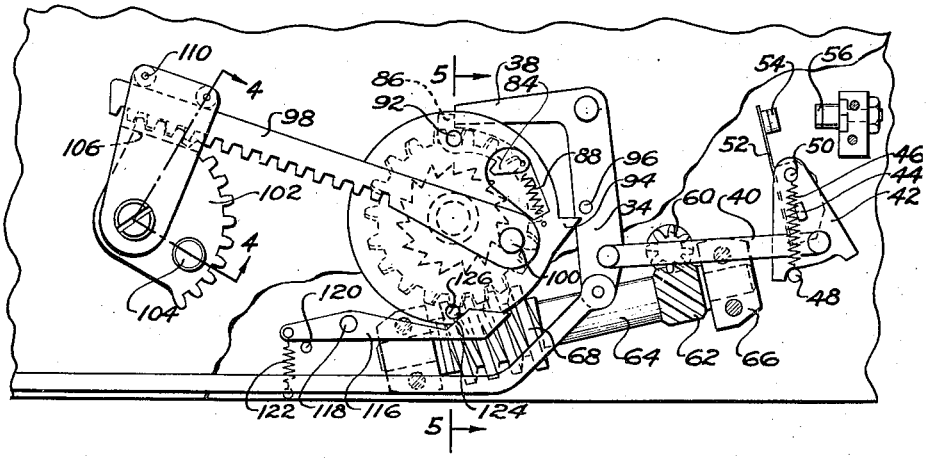
Figure 2 is a fragmentary vertical sectional view of the motor drive mechanism.

The means for controlling the motor drive mechanism is illustrated generally in Fig. 1 as comprising a motor key bar 10 secured to a key stem 12 which is mounted for reciprocatory movement relative to a frame plate 14 of the adding machine, being normally held in its uppermost position by a tension spring 16. The lower end of the key stem 12 engages the rearwardly extending arm 18 of a bell crank 20 mounted for pivotal movement upon a stud 22. The lower arm 24 of the bell crank 20 has a pin 26 projecting sidewardly through a slot 28 formed in the end of a link 30. The pin 26 is normally held at the right-hand end of the slot 28 by a tension spring 32. The rearward end of the link 30 is pivotally connected to the downwardly extending arm 34 of a bell crank stop lever which is pivoted on a stud 36 and has a forwardly projecting stop arm 38. The arm 34 is connected by a link 40 with a limit arm 42 which is pivoted upon a stud 44 (Fig. 2) and is held in either of its extreme positions of movement by a tension spring 46, one end of which is anchored to a fixed stud 48, and the other end of which is anchored to a stud 50 secured to the limit arm 42 above its pivot 44. A switch contact arm 52 is operatively secured to the limit arm 44 so as to move therewith, the switch arm 52 carrying a contact point 54 engageable with a contact point 56 to complete a circuit for energization of the driving motor. Due to the provision of the spring 46, the limit arm 42 will impart to the switch a snap action in making and breaking the electrical circuit.

As shown in Fig. 3, the driving motor 58 has a spiral pinion 60 secured to its driving shaft, this pinion meshing with a spiral gear 62 secured to a shaft 64 suitably journaled in bearings 66 secured to the frame plate 14. The shaft 64 has a worm 68 secured thereto or formed integrally therewith, the worm meshing with a worm wheel 70 which is secured by a pair of set screws 76 to a sleeve 72 rotatable upon a shaft 74. The sleeve 72 is rotatable in a bearing 78 peened to the frame plate 14.

A ratchet wheel 80 is non-rotatably secured to the sleeve 72 and is adapted to be engaged by a pawl 82 having a nose 84 engageable with the teeth of the ratchet wheel and having a tail portion 86 which is adapted to be engaged by the forwardly extending arm 38 of the lever 34. The pawl 82 is biased toward meshing engagement with the ratchet wheel 80 by a tension spring 88, one end of which is secured to the pawl and the other end of which is secured to a crank disc 90. The pawl 82 is pivoted on a shouldered stud 92 secured to the crank disc 90.

The crank disc 90 has a saw-toothed shape cam projection 94 which is adapted to engage a pin 96 on the arm 34 at the completion of one revolution of the crank disc, as will be pointed out hereinafter. A rack 98 has one end thereof pivoted to a crank pin 100 which is fixed to the crank disc 90. The rack 98 is in engagement with the teeth of an eccentric gear segment 102 which is secured to the main operating shaft 104 of the machine and rotates about this shaft as a center. The rack 98 is maintained in mesh with the segment 102 by means of a yoke consisting of a pair of plates 106, 108, which are secured together by shouldered studs 110 which form spindles for rollers 112 engaging the upper edge of the rack 98. The plate 106 is pivotally secured to the segment 102 by a shouldered stud 114. A detent lever 116 is pivotally mounted on the frame plate 14 by a stud 118 and is constrained, by a tension coil spring 122, to swing counterclockwise until arrested by a stop pin 120. The detent lever 116 has a notch 124 formed therein for engagement with a roller 126 which is rotatable on a stud 128 carried by the crank disc 90.

In operation, upon pressing the key bar 10 downwardly, the bell crank 20 will be swung clockwise, thus moving the link 30 to the left (Fig. 1), and by such movement disengaging the end of the arm 38 from the heel 86 of the pawl 82, permitting the nose 84 of the pawl to engage the ratchet wheel 80. Such left-ward movement of the link 30 also causes clockwise pivotal movement of the limit arm 42 past dead center position, whereupon the spring 46 will assure completion of the bringing together of contacts 54 and 56 with a snap action. The circuit completed by the engagement of contacts 54 and 56 energizes the motor 58, which, through the spiral gears 60 and 62 and worm 68, drives the worm wheel 70, and hence also the ratchet wheel 80. Since the pawl 82 is then in engagement with the ratchet wheel, the ratchet wheel will have a driving connection with the crank disc 90.

As the crank disc rotates clockwise, the rack 98 will swing the eccentric segment 102 counterclockwise about its pivot 104. Upon the return stroke of the rack 98, the segment 102 will, of course, be swung clockwise to complete the operative cycle of the adding machine.

If the operator releases the key bar prior to the completion of the operative cycle of the machine, the key stem 12, the bell crank 20, link 30, and arm 34, will be returned to the positions in which these parts are shown in the drawings by their respective springs and by the engagement of the cam projection 94 with the pin 96. It will be understood that such engagement of cam 94 with pin 96 takes place prior to the completion of the operative cycle, and that it results in opening the switch contacts 54 and 56 and the disengagement of the pawl 82 from the ratchet wheel 80, since the heel of the pawl will be engaged by the end of the arm 38 and will be swung counterclockwise thereby.

If the operator maintains the key bar 10 depressed to cause repeated operation of the machine, as is necessary in the performance of multiplication, the bell crank 20 will, of course, be maintained in its displaced position, but the link 30, due to the lost motion connection between its end and the depending arm of the bell crank 20, will be free to move to the right when the bell crank lever 34 is moved counterclockwise as its pin 96 is engaged by the cam projection 94. This movement of the lever 34 will be transmitted as a vibration through the bell crank 20 to the key bar 10 so that the operator will be able to sense by touch the completion of an operation of the machine and thus facilitate the use of the machine in multiplication operations. It will be understood that multiplication operations are performed by repeated addition. The speed of performing the operation is thus increased if the operator receives the tactile signal through the key bar 10, and can thus readily count the operations of the machine.

As a result of the use of the intermediate rack 98 and eccentric segment 102, the motion imparted to the main shaft 104 is not the simple harmonic motion of the usual crank pin drive, but is of a novel form, illustrated by the curve of Fig. 6. It will be noted that this curve is plotted with the degree of angular displacement of the main shaft as ordinates and the angular displacement of the crank shaft 74 as abscissas. From this curve, it will be noted that after the crank shaft has been rotated through an angle of approximately 165°, the main shaft will have completed its forward stroke, and that during the remaining 195° of rotation of the crank shaft 74, the main shaft 104 will have been on its return stroke. On this curve, the velocity of the movement is represented by the slope of the curve, and bearing this in mind, it will be apparent that the forward stroke of the main shaft commences at a relatively slow speed, accelerates rather rapidly, and then decelerates gradually toward the end of the forward stroke. Upon the return stroke, the speed will initially be relatively slow, will accelerate rather rapidly, but not as rapidly as on the forward stroke, until maximum speed is reached, and will decelerate at a substantially uniform rate until the crank returns to its normal position.

By virtue of the provision of the eccentric segment 102 driven by the rack 98, the otherwise nearly harmonic motion of the rack is modified, but the characteristics of harmonic motion are sufficiently retained in the ultimate movement of the main shaft 104 that the acceleration and deceleration are substantially at a uniform rate, the uniformity of the rate of acceleration and deceleration being of considerable advantage in reducing the strain upon the power transmitting parts of the machine. As previously stated, the departure of the curve of Fig. 6 from a sine wave is not sufficiently great to affect materially the starting and stopping speed characteristics of the curve.

It will be noticed that as soon as an operating cycle is completed, the pawl 82 is released from the ratchet wheel 80, thus likewise freeing the worm wheel 70 for rotation relative to the shaft 74. Thereafter, as soon as the operating cycle is completed, the load is disconnected from the motor so that the latter may coast to a stop and is not subjected to the strains which would be applied to the motor drive gearing if it were attempted to stop the motor suddenly upon completion of each cycle of operation.

While I have shown and described a particular form of my invention, it will be apparent to those skilled in the art that numerous variations and alterations may be made without departing from the underlying principles of the invention. I therefore desire, by the following claims, to include within the scope of my invention all such modifications and variations by which substantially the results of my invention may be obtained by the use of substantially the same or equivalent means.

I claim:

1. In an adding machine having a main shaft and a motor for driving said main shaft, a driving connection between the motor and the main shaft comprising, a crank driven by said motor, a gear quadrant rigidly secured to the main shaft eccentrically with respect thereto, and a rectilinear rack meshing with said quadrant and pivotally connected to said crank.

2. In a motor drive mechanism for adding machines and the like which have a power source and a speed-reducing gear train driven from said source, the combination of an oscillatory main shaft, a gear secured to said main shaft with its pitch circle eccentric to said shaft, a rack meshing with said gear, and a crank driven from said speed-reducing gear train and operatively connected to said rack.

3. In a drive mechanism for adding machines and the like having a motor and a part rotated by the motor, the combination of a crank adapted to be connected to said part for rotation therewith, a main shaft to be oscillated, a gear segment secured to said main shaft with its pitch circle eccentric thereto, a rack meshing with said gear segment and pivotally secured to said crank and forming with said gear segment a driving connection between said crank and said main shaft, whereby rotation of said crank will cause said main shaft to be driven in one direction through more than one-half revolution of said crank and to be driven in its opposite direction through less than one-half revolution of said crank.

4. In a drive mechanism for adding machines and the like having a motor, a part rotated by said motor, and a one-revolution clutch mechanism adapted to arrest said part in a predetermined angular position, the combination of a crank driven by said part when said clutch mechanism is operative, a main shaft, a gear segment having its teeth located in an arc of a circle, a rigid driving connection between said gear segment and said main shaft, said driving connection including a pivotal mounting for said gear segment which is eccentric to the gear teeth thereof, and a rack meshing with the teeth of said gear segment and pivotally connected to said crank.

5. In a motor drive mechanism for adding machines and the like having a motor and a crank rotated thereby, the combination of a rack having one end pivotally secured to said crank for reciprocation thereby, a main shaft to be oscillated, a gear secured to said shaft with its pitch circle eccentric thereto, a pair of plates mounted for pivotal movement about the center of said gear, and a pair of rollers between said plates and engaging said rack to hold the latter in mesh with said gear, whereby said rack is retained in engagement with said gear, and said main shaft is oscillated with its stroke in one direction taking place through more than one-half revolution of said crank and its stroke in the opposite direction taking place through the remaining portion of the crank revolution.

THOMAS O. MEHAN.